United States Patent
Bold

(10) Patent No.: US 10,438,151 B2
(45) Date of Patent: Oct. 8, 2019

(54) TAKE RATE DETERMINATION

(71) Applicant: Mentor Graphics Corporation, Wilsonville, OR (US)

(72) Inventor: Stephen Bold, Berkshire (GB)

(73) Assignee: Mentor Graphics Corporation, Wilsonville, OR (US)

( * ) Notice: Subject to any disclaimer, the term of this patent is extended or adjusted under 35 U.S.C. 154(b) by 798 days.

(21) Appl. No.: 14/580,663

(22) Filed: Dec. 23, 2014

(65) Prior Publication Data

US 2016/0180273 A1   Jun. 23, 2016

(51) Int. Cl.
*G06Q 10/06* (2012.01)
(52) U.S. Cl.
CPC ............... *G06Q 10/06315* (2013.01)
(58) Field of Classification Search
CPC ...................................................... G06Q 10/06
See application file for complete search history.

(56) References Cited

U.S. PATENT DOCUMENTS

| | | | | |
|---|---|---|---|---|
| 8,078,489 B1* | 12/2011 | Marsten | .............. | G06Q 10/04 705/7.25 |
| 2004/0205009 A1* | 10/2004 | Noto | ............. | G06Q 10/087 705/34 |
| 2004/0210676 A1* | 10/2004 | Noto | ............. | G06F 9/445 710/1 |
| 2010/0031212 A1* | 2/2010 | Dong | ............. | G06F 17/50 716/100 |
| 2011/0150315 A1* | 6/2011 | Bendixen | ............. | G06F 8/63 382/141 |
| 2012/0084231 A1* | 4/2012 | McNaught | ......... | G06Q 30/0283 705/400 |
| 2015/0312603 A1* | 10/2015 | Singh | ............. | H04N 21/251 725/93 |

* cited by examiner

*Primary Examiner* — Kurtis Gills
(74) *Attorney, Agent, or Firm* — Mentor Graphics Corporation

(57) ABSTRACT

This application discloses a system implementing tools and mechanisms to receive a target rate for each option available for inclusion in a harness family, determine combination take rates for different combinations of the options based on the target rates for the options, and utilize the combination take rates and the combinations of the options to identify one or more wire harnesses, each including a different set of the options, in the harness family. The tools and mechanisms can determine the combination take rates by estimating values for the combination take rates corresponding to the combinations of the options, and iteratively adjusting the values for the combination take rates based on the target rates for the options.

17 Claims, 7 Drawing Sheets

| | OPTION 601A | OPTION 601B | OPTION 601C | COMBINATION TAKE RATES 604 |
|---|---|---|---|---|
| COMBINATION 602A | | | | ? |
| COMBINATION 602B | X | X | | ? |
| COMBINATION 602C | | X | X | ? |
| COMBINATION 602D | X | | | ? |
| COMBINATION 602E | X | | X | ? |
| TARGET OPTION RATES 603 | 20% | 30% | 40% | |

FIG. 6A

| | OPTION 601A | OPTION 601B | OPTION 601C | COMBINATION TAKE RATES 622 |
|---|---|---|---|---|
| COMBINATION 602A | | | | 27.8% |
| COMBINATION 602B | X | X | | 13.9% |
| COMBINATION 602C | | X | X | 25% |
| COMBINATION 602D | X | | | 16.7% |
| COMBINATION 602E | X | | X | 16.7% |
| TARGET OPTION RATES 603 | 20% | 30% | 40% | |
| ACTUAL OPTION RATES 621 | 47.3% | 38.9% | 41.7% | |

FIG. 6C

|  | OPTION 601A | OPTION 601B | OPTION 601C | COMBINATION TAKE RATES 604 | TOTAL CORRECTION 615 | AVERAGE CORRECTION 616 | CORRECTED TAKE RATE 617 |
|---|---|---|---|---|---|---|---|
| COMBINATION 602A |  |  |  | 20% | 23.3% | 7.8% | 27.8% |
| COMBINATION 602B | X | X |  | 20% | -18.3% | -6.1% | 13.9% |
| COMBINATION 602C |  | X | X | 20% | 15% | 5% | 25% |
| COMBINATION 602D | X |  |  | 20% | -10% | -3.3% | 16.7% |
| COMBINATION 60E | X |  | X | 20% | -10% | -3.3% | 16.7% |
| TARGET OPTION RATES 603 | 20% | 30% | 40% |  |  |  |  |
| ACTUAL OPTION RATES 611 | 60% | 40% | 40% |  |  |  |  |
| MISSING RATES 612 | -40% | -10% | 0% |  |  |  |  |
| MISSING RATE PER SUPPORTED ROW 613 | -13.3% | -5% | 0% |  |  |  |  |
| MISSING RATE PER UNSUPPORTED ROW 614 | 20% | 3.3% | 0% |  |  |  |  |

FIG. 6B

|  | OPTION 601A | OPTION 601B | OPTION 601C | COMBINATION TAKE RATES 632 |
|---|---|---|---|---|
| COMBINATION 602A |  |  |  | 48.7% |
| COMBINATION 602B | X | X |  | -1.2% |
| COMBINATION 602C |  | X | X | 31.2% |
| COMBINATION 602D | X |  |  | 12.5% |
| COMBINATION 602E | X |  | X | 8.8% |
| TARGET OPTION RATES 603 | 20% | 30% | 40% |  |
| ACTUAL OPTION RATES 631 | 20.1% | 30.1% | 40% |  |

FIG. 6D

|  | OPTION 601A | OPTION 601B | OPTION 601C | COMBINATION TAKE RATES 642 |
|---|---|---|---|---|
| COMBINATION 602A |  |  |  | 48.1% |
| COMBINATION 602B | X | X |  | 0% |
| COMBINATION 602C |  | X | X | 30.9% |
| COMBINATION 602D | X |  |  | 12.4% |
| COMBINATION 602E | X |  | X | 8.7% |
| TARGET OPTION RATES 603 | 20% | 30% | 40% |  |

FIG. 6E

TAKE RATE DETERMINATION

TECHNICAL FIELD

This application is generally related to electronic design automation and, more specifically, to determining take rates for combinations of product options.

BACKGROUND

Some manufacturers offer products to consumers with a variety of available options. A common example would be the automotive industry, which allows its customers to select among a large number of options when purchasing vehicles. In some cases, these available options may be mutually exclusive, such as engine type, but often times different available options can be mixed-and-matched based on consumer desire. Since there are costs associated with supporting any option, to provide this kind of customization, auto manufacturers typically divide their products into different levels, each having their own set of available options.

To determine which options to include in which level, the manufacturers identify groups of options that consumers could select for a product and then estimate how often each of the groups of option will be selected by the consumers. These estimates, called take rates, are usually performed manually by the manufacturers. While many manufacturers can provide a reasonably accurate estimate how often consumers will select a certain option for a product, sometimes called an option rate, figuring out how often each of these options is combined with various different options remains difficult. To further complicate matters, since for every additional available option for a product, the number of groups of options that are selectable grows, often times exponentially, the difficulty increases as the product customizability increases. To appease consumers demand for customizability, many manufacturers over support options in their product families, which adds unnecessary cost to their products when certain options go largely unselected by consumers.

SUMMARY

This application discloses a system implementing tools and mechanisms to receive a target rate for each option available for inclusion in a harness family, determine combination take rates for different combinations of the options based on the target rates for the options, and utilize the combination take rates and the combinations of the options to identify one or more wire harnesses, each including a different set of the options, in the harness family. The tools and mechanisms can determine the combination take rates by estimating values for the combination take rates corresponding to the combinations of the options, and iteratively adjusting the values for the combination take rates based on the target rates for the options.

DESCRIPTION OF THE DRAWINGS

FIGS. 6A-6E illustrate an example implementation of a combination take rate determination according to various embodiments of the invention.

DETAILED DESCRIPTION

Illustrative Operating Environment

The execution of various electronic design automation processes according to embodiments of the invention may be implemented using computer-executable software instructions executed by one or more programmable computing devices. Because these embodiments of the invention may be implemented using software instructions, the components and operation of a generic programmable computer system on which various embodiments of the invention may be employed will first be described. Further, because of the complexity of some electronic design automation processes and the large size of many designs, various electronic design automation tools are configured to operate on a computing system capable of simultaneously running multiple processing threads.

Figure 1:
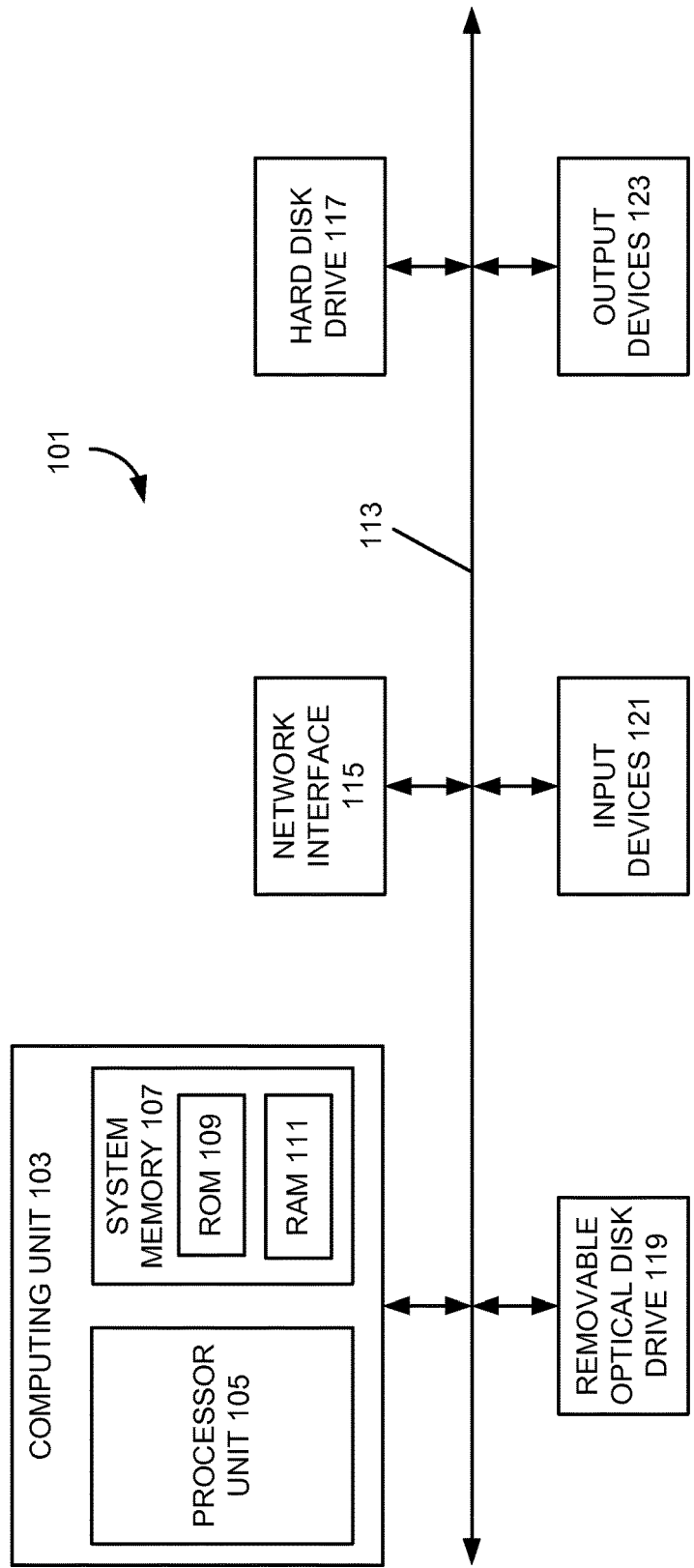
FIGS. 1 and 2 illustrate an example of a computer system of the type that may be used to implement various embodiments of the invention.

Various examples of the invention may be implemented through the execution of software instructions by a computing device, such as a programmable computer. Accordingly, FIG. 1 shows an illustrative example of a computing device 101. As seen in this figure, the computing device 101 includes a computing unit 103 with a processing unit 105 and a system memory 107. The processing unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The processing unit 105 and the system memory 107 are connected, either directly or indirectly, through a bus 113 or alternate communication structure, to one or more peripheral devices. For example, the processing unit 105 or the system memory 107 may be directly or indirectly connected to one or more additional memory storage devices, such as a "hard" magnetic disk drive 115, a removable magnetic disk drive 117, an optical disk drive 119, or a flash memory card 121. The processing unit 105 and the system memory 107 also may be directly or indirectly connected to one or more input devices 123 and one or more output devices 125. The input devices 123 may include, for example, a keyboard, a pointing device (such as a mouse, touchpad, stylus, trackball, or joystick), a scanner, a camera, and a microphone. The output devices 125 may include, for example, a monitor display, a printer and speakers. With various examples of the computer 101, one or more of the peripheral devices 115-125 may be internally housed with the computing unit 103. Alternately, one or more of the peripheral devices 115-125 may be external to the housing for the computing unit 103 and connected to the bus 113 through, for example, a Universal Serial Bus (USB) connection.

With some implementations, the computing unit 103 may be directly or indirectly connected to one or more network interfaces 127 for communicating with other devices making up a network. The network interface 127 translates data and control signals from the computing unit 103 into network messages according to one or more communication protocols, such as the transmission control protocol (TCP) and the Internet protocol (IP). Also, the interface 127 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computer 101 is illustrated as an example only, and it not intended to be limiting. Various embodiments of the invention may be implemented using one or more computing devices that include the components of the computer 101 illustrated in FIG. 1, which include only a subset of the components illustrated in FIG. 1, or which include an alternate combination of components, including components that are not shown in FIG. 1. For example, various embodiments of the invention may be implemented using a multi-processor computer, a plurality of single and/or multiprocessor computers arranged into a network, or some combination of both.

Figure 2:
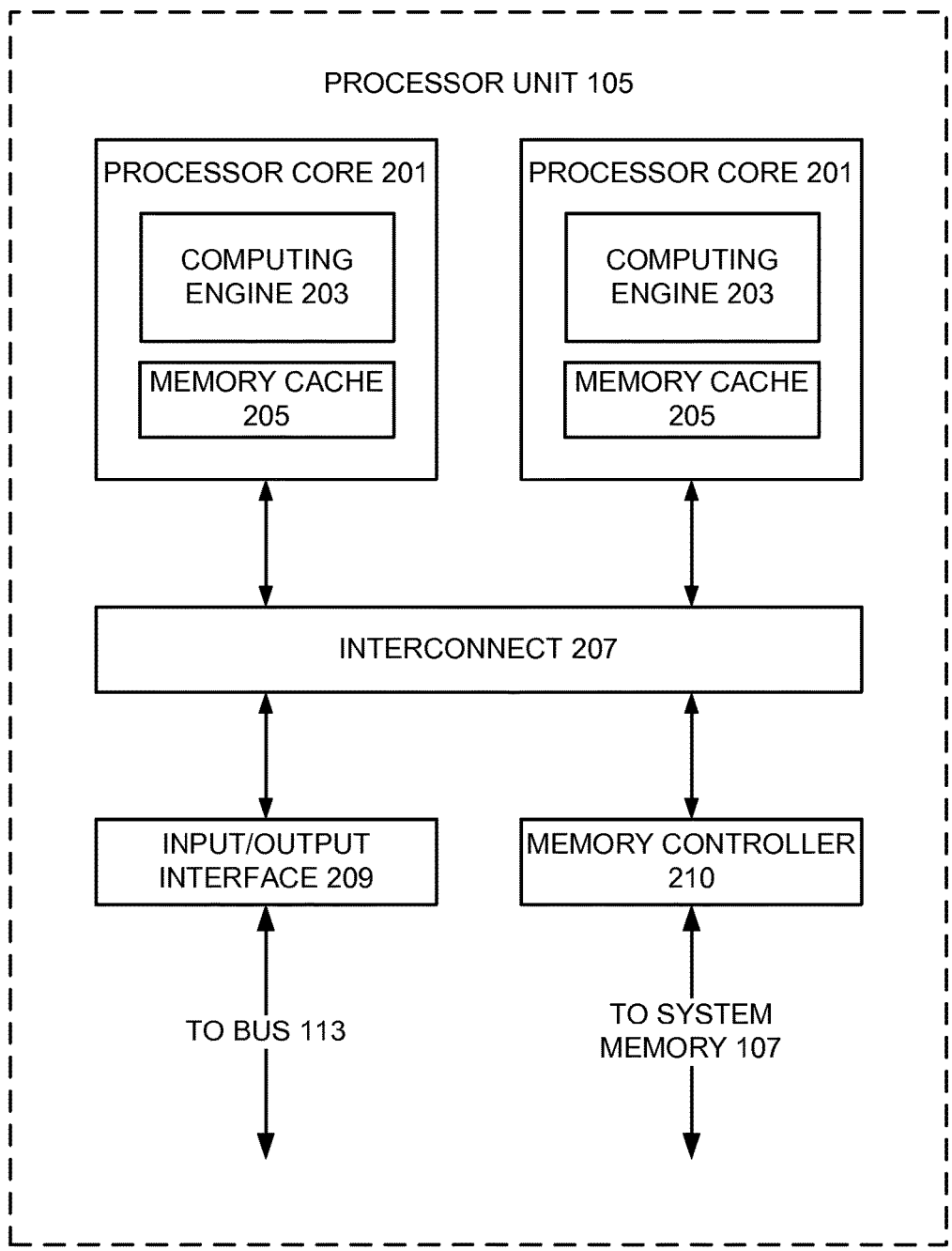

With some implementations of the invention, the processor unit 105 can have more than one processor core. Accordingly, FIG. 2 illustrates an example of a multi-core processor unit 105 that may be employed with various embodiments of the invention. As seen in this figure, the processor unit 105 includes a plurality of processor cores 201. Each processor core 201 includes a computing engine 203 and a memory cache 205. As known to those of ordinary skill in the art, a computing engine contains logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203 may then use its corresponding memory cache 205 to quickly store and retrieve data and/or instructions for execution.

Each processor core 201 is connected to an interconnect 207. The particular construction of the interconnect 207 may vary depending upon the architecture of the processor unit 201. With some processor cores 201, such as the Cell microprocessor created by Sony Corporation, Toshiba Corporation and IBM Corporation, the interconnect 207 may be implemented as an interconnect bus. With other processor units 201, however, such as the Opteron™ and Athlon™ dual-core processors available from Advanced Micro Devices of Sunnyvale, Calif., the interconnect 207 may be implemented as a system request interface device. In any case, the processor cores 201 communicate through the interconnect 207 with an input/output interface 209 and a memory controller 211. The input/output interface 209 provides a communication interface between the processor unit 201 and the bus 113. Similarly, the memory controller 211 controls the exchange of information between the processor unit 201 and the system memory 107. With some implementations of the invention, the processor units 201 may include additional components, such as a high-level cache memory accessible shared by the processor cores 201.

It also should be appreciated that the description of the computer network illustrated in FIG. 1 and FIG. 2 is provided as an example only, and it not intended to suggest any limitation as to the scope of use or functionality of alternate embodiments of the invention.

Illustrative Take Rate Determination

Figure 3:
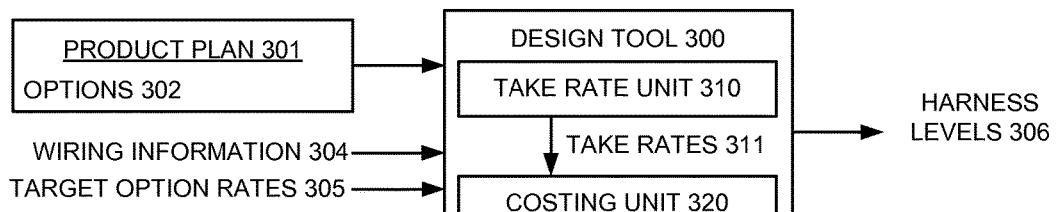
FIG. 3 illustrates an example design tool to determine combination take rates for different product option combinations according to various embodiments of the invention.

FIG. 3 illustrates an example design tool 300 to determine combination take rates for different product option combinations according to various embodiments of the invention. Referring to FIG. 3, the design tool 300 can receive a product plan 301, which can describe a product, such as an electronic system, vehicle, airplane, or the like. The product plan 301 can include options 302 for the product. For example, when the product is a vehicle, the options 302 can include engine type, air conditioning, seat heaters, power windows, power steering, power door locks, etc.

The design tool 300 can include a take rate unit 310 to determine which of the option 302 are selected together in different combinations. These combinations of the options 302, for example, ranging from none of the options 302 to groups including multiple different options 302. The take rate unit 310 can generate combination take rates 311 for the combinations of the options 202 in the product plan 301 based, at least in part, on target option rates 305 received by the design tool 300. Each of the target option rates 305 can correspond to a percentage, a total number, a proportion, a ratio, or the like, of the products sold or manufactured that are estimated to include a different option 302 in the product plan 301. For example, when the product is a vehicle, the option rates can specify a percentage, a total number, a proportion, a ratio, or the like, of vehicles estimated to include a certain type of engine, a percentage or total number of the vehicles to include air conditioning, or any other option. In some embodiments, the product plan 201 and the target option rates 305 can be received by the design tool 300 via a user interface (not shown) or otherwise be based on user input.

The take rate unit 310 can utilize the target option rates 305 received by the design tool 300 to determine combination take rates 311 for the combinations of the options 202. Each of the combination take rates 311 can correspond to a percentage, a total number, a proportion, a ratio, or the like, of the products sold or manufactured estimated to include a different combination of the options 302. Embodiments of for determining the combination take rates for different combinations of options based, at least in part, on target option rates will be described below in greater detail.

The design tool 300 can include a costing unit 320 to utilize the combination take rates 311 to determine one or more harness levels 306 for the product, which can support different sets or subsets of the options 302 for the product. In other words, rather than build one product type, such as a harness family, capable of implementing every option 302 in the product plan 301, the design tool 300 can determine different harness levels 306 that support different sets or subsets of the options 302 for the product, as to avoid the extra cost of supporting unselected product options.

In some embodiments, the design tool 300 receive other information, such as wiring information 304 describing components in wire harnesses implementing the options 302 in the product, such as wires, bundles, connectors, or the like, which can optionally include an associated cost for those components. In some embodiments, the wiring information 304 can be received by the design tool 300 via a user interface (not shown) or otherwise be based on user input. In some embodiments, the costing unit 320 can utilize the wiring information 304 to determine which options to support in which harness levels 306. Since the wiring information 304 can include costs associated with supporting different options 302, such as the cost of the components of a wire harness, the costing unit 320 can determine which options 302 to include in which harness level 306 to reduce supporting options 302 a consumer ultimately does not select for the product.

Figure 4:
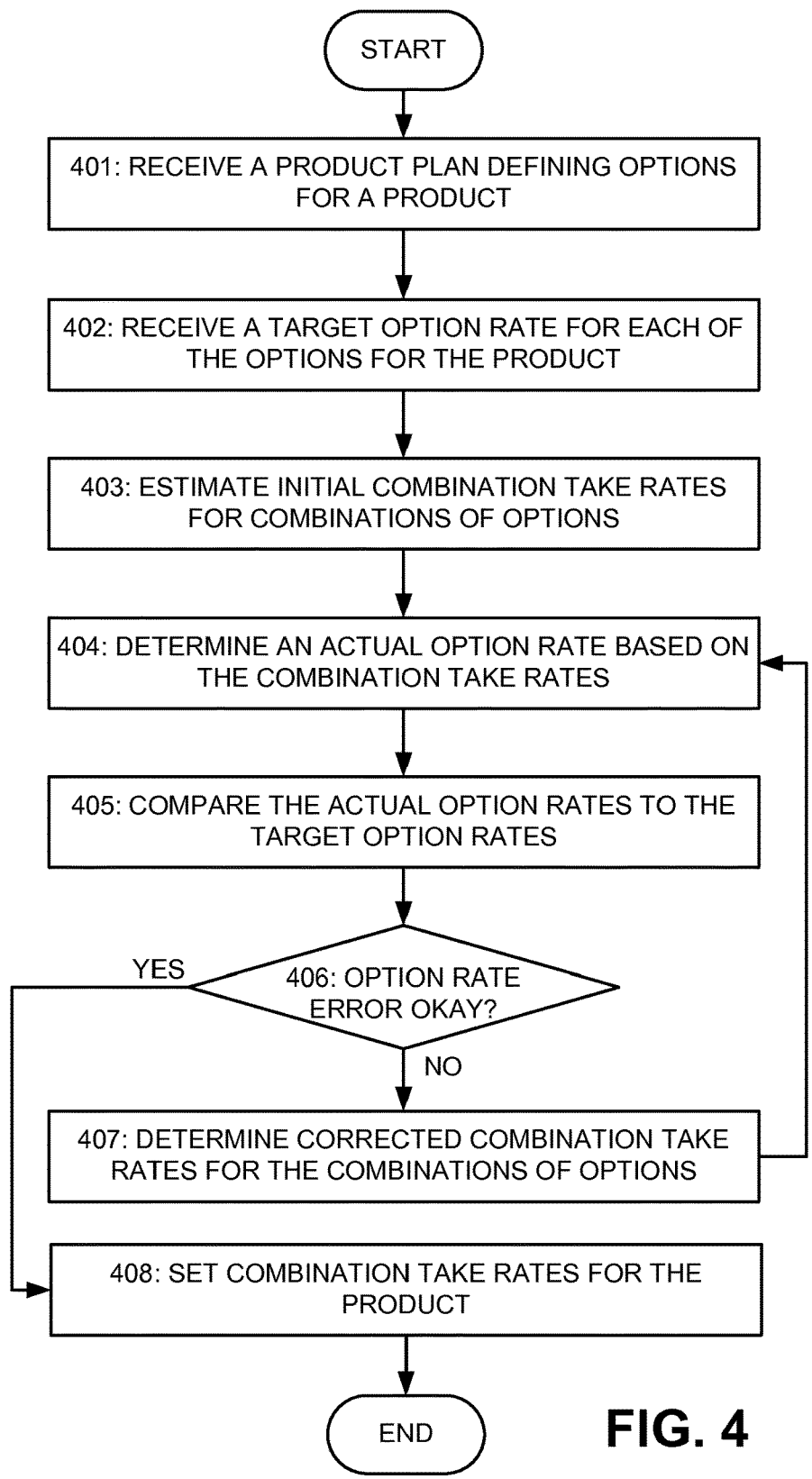
FIG. 4 illustrates a flowchart showing an example determination of combination take rates for different product option combinations according to various embodiments of the invention.

FIG. 4 illustrates a flowchart showing an example determination of combination take rates for different product option combinations according to various embodiments of the invention. Referring to FIG. 4, in a block 401, a computing system can receive a product plan defining options. For example, when the product in the product plan described a vehicle, the options can include engine type, air conditioning, seat heaters, power windows, power steering, power door locks, etc. From information in the product plan, the computing system can derive different combinations of the options, for example, selectable together and available in the product, which can range from including none of the options to groups including one or more of the different options. In some embodiments, the computing system can receive the product plan via a user interface or otherwise be based on user input.

In a block 402, the computing system can receive a target option rate for each of the options for the product. Each of the target option rates can correspond to a percentage or total number of the products sold or manufactured that are estimated to include a different option in the product plan. For example, when the product is a vehicle, the option rates can specify a percentage or total number of vehicles estimated to include a certain type of engine, a percentage or total number of the vehicles to include air conditioning, or any other option, etc. In some embodiments, the computing system can receive the target option rates via a user interface or otherwise be based on user input.

In a block 403, the computing system can estimate initial combination take rates for the combinations of options. Each of the initial combination take rates can correspond to a percentage (or number) of the products that include a different combination of options. The initial combination take rates can add up to 100% or the total number of products. In some embodiments, the computing system can set the initial combination take rates for the combinations of options to be equal. In other embodiments, the computing system can set the combination take rates for the combinations of options based on a number of options, a number of combinations, or the like.

In a block 404, the computing system can determine an actual option rate based on the initial combination take rates. Each of the actual option rates can correspond to a percentage (or number) of the products that include a different option. For example, in determining an actual option rate for a particular option, the computing system can determine which combinations include the particular option and then ascertain from the combination take rates a total percentage (or number) of the products that include at least one of the determined combinations. Embodiments of the determination of actual option rates based on the combination take rates.

In a block 405, the computing system can compare the actual option rates to the target option rates, and in a block 406, the computing system can analyze an error associated with a difference between the actual option rates and the target option rates. In some embodiments, the analysis of the error can include comparing the error to a previously determined error to determine whether the error has decreased. In other embodiments, the analysis of the error can include determining whether the error falls outside of an error tolerance. The error tolerance can be a threshold percentage or number of products, or range of percentages and product number, which can be based on input received via a user interface.

When, in block 406, the analysis of the error associated with the difference between the actual option rates and the target option rates indicates that additional adjustment of the combination takes rates should be performed, in a block 407, the computing system can determine corrected combination take rates for the combinations of options based on the difference between the actual option rates and the target option rates. For example, the computing system, at block 406, can proceed to block 407 when the error decreases compared to a previously determined error, or when the error falls within the error tolerance. After execution of block 407, execution can return to block 404, where the computing system can replace the initial combination take rates with the corrected combination take rates and utilize the corrected combination take rates to determine a new set of actual option rates for the product options. The execution of blocks 404-407 can continue until the computing system, in block 406, the analysis of the error associated with the difference between the actual option rates and the target option rates indicates that no additional adjustment of the combination takes rates should be performed.

When, in block 406, the analysis of the error associated with the difference between the actual option rates and the target option rates indicates that no additional adjustment of the combination takes rates should be performed, execution continues to a block 408, where the computing system can set combination take rates for the product. The combination take rates for the product can be the combination take rates utilized to generate the actual option rates in block 404.

In some embodiments, the computing system can analyze the combination take rates utilized to generate the actual option rates in block 404 to determine whether any of the combination take rates are negative numbers, values, or percentages. In this instance, the computing system can set the negative numbers, values, or percentages to zero and allocate a corresponding reduction in numbers, values, or percentages for one or more of the other combination take rates. For example, the computing system can divide the combination take rate reduction among the remaining combination take rates, equally, pro rata, proportionally, or the like. The computing system can then set the adjusted combination take rates as the combination take rates for the product.

Figure 5:
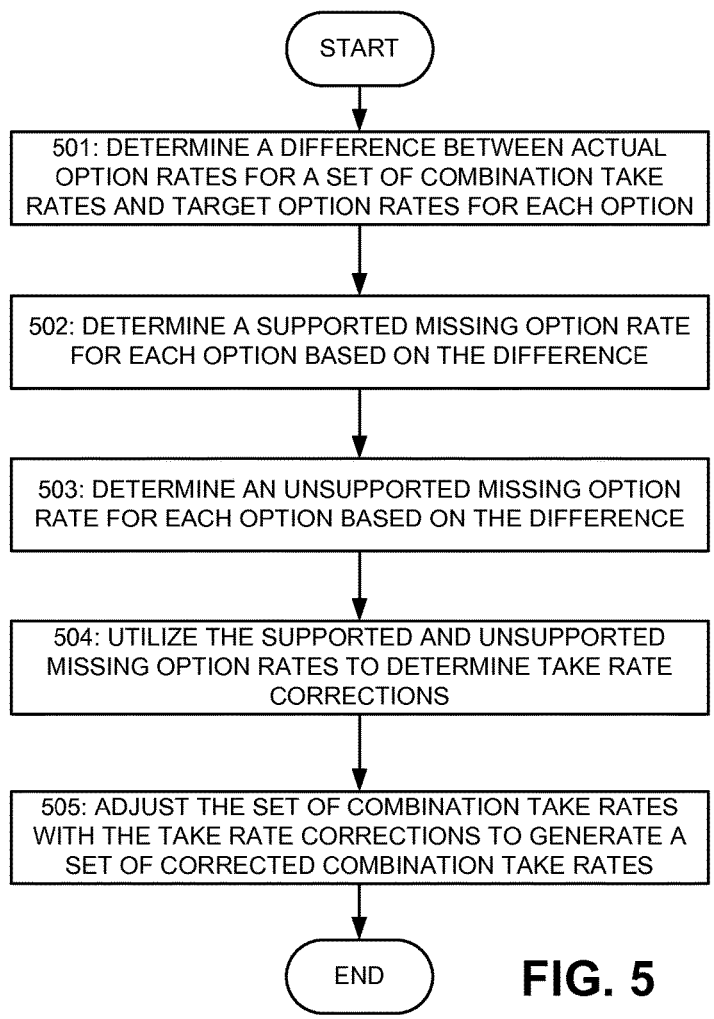
FIG. 5 illustrates a flowchart showing an example correction of estimated combination take rates according to various embodiments of the invention.

FIG. 5 illustrates a flowchart showing an example correction of estimated combination take rates according to various embodiments of the invention. Referring to FIG. 5, in a block 501, a computing system can determine a difference between actual option rates for a set of combination take rates and target option rates for each option. In some embodiments, the computing system can subtract the actual option rates and target option rates for each option to determine the difference.

In a block 502, the computing system can determine a supported missing option rate for each option based on the differences between actual option rates and target option rates. For example, the computing system can determine a number of the total combinations that include a particular option and then divide the difference between the actual option rate for the particular option and the target option rate for the particular option by the determined number, which results in the supported missing option rate for the particular option. This determination can be performed for each option of the product. An example of the determination for the supported missing option rate will be described below in greater detail.

In a block 503, the computing system can determine an unsupported missing option rate for each option based on the differences between actual option rates and target option rates. For example, the computing system can determine a number of the total combinations that do not include a particular option and then divide the difference between the actual option rate for the particular option and the target option rate for the particular option by the determined number, which results in the unsupported missing option rate for the particular option. This determination can be performed for each option of the product. An example of the determination for the unsupported missing option rate will be described below in greater detail.

In a block 504, the computing system can utilize the supported missing option rates and unsupported missing option rates to determine combination take rate corrections. For each combination of options, the computing system can determine which options are supported by the combination and which options are unsupported by the combination. The computing system can then identify supported missing option rates corresponding to the supported options and identify unsupported missing option rates corresponding to the unsupported options, which the computing system can average into the combination take rate corrections. An example of the determination for the combination take rate correction will be described below in greater detail.

In a block 505, the computing system can adjust the set of combination take rates with the combination take rate corrections to generate a set of corrected combination take rates. In some embodiments, the computing system can add the combination take rate corrections to the combination take rates on a combination-by-combination basis. The computing system can utilize the corrected combination take rates to generate new actual option rates, which the computing system can utilize to execute block 501 again. This process can iteratively adjust the combination take rates for the combinations of options until a set of corrected combination take rates can be used to generate actual option rates fall within a predetermined error range or threshold of the target option rates.

FIGS. 6A-6E illustrate an example implementation of a combination take rate determination according to various embodiments of the invention. Referring to FIGS. 6A, this example of the combination take rate determination can include multiple different product options 601A-601C, which can be variously included into multiple different option combinations 602A-602E. For sake of explanation, the product options 601A-601C and the option combinations 602A-602E have been arranged in a row-column format with each product option 601A-601C having a separate column and each option combination 602A-602E having a separate row.

Each of the product options 601A-601C can have an associated target option rate 603, for example, which can indicate a percentage or a number of the products that are targeted to include the corresponding product option 601A-601C. In some embodiments, the target option rates 603 can be user specified, for example, input to a design tool or computing system performing the combination take rate determination via a user interface.

Referring to FIG. 6B, the combination take rate determination can begin with a computing system estimating values of combination take rates 604 for each option combination 602A-602E. In the instant example, the values of the combination take rates 604 were initially estimated to be equal for each option combination 602A-602E, but, in some embodiments, different percentage allocations to the values of the combination take rates 604 can be utilized.

The combination take rate determination can then include a determination of actual option rates 611 for each of the product options 601A-601C based on the values of the combination take rates 604. Each actual option rate 611 can correspond to a percentage (or number) of the products that include a particular product options 601A-601C based on the values of the combination take rates 604. For product option 601A, the actual option rate 611 can be an aggregate of the values of the combination take rates 604 corresponding to option combinations 602B, 602D, and 602E, which include product option 601A. For product option 601B, the actual option rate 611 can be an aggregate of the values of the combination take rates 604 corresponding to option combinations 602B and 602C, which include product option 601B. For product option 601C, the actual option rate 611 can be an aggregate of the values of the combination take rates 604 corresponding to option combinations 602C and 602E, which include product option 601C.

The combination take rate determination can then include a determination of missing rates 612 for each of the product options 601A-601C. In some embodiments, the missing rates 612 can be the target option rates 603 subtracted by the actual option rates 611 for each of the product options 601A-601C. If the missing rates 612 fall within an error range associated with the target option rates 603, then the combination take rate determination can utilize the values of the combination take rates 604 as the combination take rates for the option combinations 602A-602E. As discussed above, in some embodiments, the combination take rate determination can also include some additional adjustment to the values of the combination take rates 604, for example, to remove and distribute negative values for one or more of the combination take rates 604.

If, however, the missing rates 612 do not fall within an error range associated with the target option rates 603, then the combination take rate determination can generate new values for the combination take rates 604. Although there may be multiple different ways to generate new values for the combination take rates 604, in this example, the combination take rate determination can include a determination of missing rates per supported row 613 and missing rates per unsupported row 614 based on the missing rates 612. For each product option 601A-601C, the corresponding missing rates 612 can be divided by a number of the option combinations 602A-602E that support the corresponding product option 601A-601C to generate the missing rates per supported row 613. For each product option 601A-601C, the corresponding missing rates 612 can be divided by a number of the option combinations 602A-602E that do not support the corresponding product option 601A-601C to generate the missing rates per unsupported row 614.

The combination take rate determination can then include a determination of a total correction 615 for each of the option combinations 602A-602E based on the missing rates per supported row 613 and missing rates per unsupported row 614. For example, since the option combination 602A does not support any of the product options 601A-601C, the missing rates per unsupported row 614 corresponding to each of the product options 601A-601C can be aggregated into a total correction 615 for the option combination 602A. For option combination 602B, since product options 601A and 601B are supported and product option 601C is not supported, the missing rates per supported row 613 corresponding to product options 601A and 601B can be aggregated with the missing rates per unsupported row 614 corresponding to product option 601C to generate a total correction 615 for the option combination 602B. For option combination 602C, since product options 601B and 601C are supported and product option 601A is not supported, the missing rates per supported row 613 corresponding to product options 601B and 601C can be aggregated with the missing rates per unsupported row 614 corresponding to product option 601A to generate a total correction 615 for the option combination 602C. For option combination 602D, since product option 601A is supported and product options 601B and 601C are not supported, the missing rates per supported row 613 corresponding to product option 601A can be aggregated with the missing rates per unsupported row 614 corresponding to product options 601B and 601C to generate a total correction 615 for the option combination 602D. For option combination 602E, since product options 601A and 601C are supported and product option 601B is not supported, the missing rates per supported row 613 corresponding to product options 601A and 601C can be aggregated with the missing rates per unsupported row 614 corresponding to product option 601B to generate a total correction 615 for the option combination 602E.

The combination take rate determination can include a determination of average corrections 616 for each of the option combinations 602A-602E based on the total correction 615 and a number of product options 601A-601C. In some embodiments, the total correction 615 can be divided by a number of product options 601A-601C to generate the average correction 616 for each of the option combinations 602A-602E. The combination take rate determination can then generate of corrected combination take rates 617 for each of the option combinations 602A-602E, which can replace values of the combination take rates 604 in a subsequent iteration of combination take rate determination. For example, in FIG. 6C, the values of the combination take rates 604 can be replaced by values of the corrected combination take rates 617 to become combination take rates 622, which can be utilized to generate a different set of missing rates based on values associated with the combination take rates 622.

This iterative process can continue one or more additional times, for example, until a difference between target option rates 603 and actual option rates for a given set of combination take rates fall within an error tolerance or range associated with the target option rates 603. For example, FIG. 6D shows a set of combination take rates 632 for the option combinations 602A-602E that have corresponding actual option rates 631 sufficiently close enough to the target option rates 603 to fall within the error range associated with the target option rates 603.

For illustrative purposes, since the combination take rates 632 include a negative value, for example, corresponding to option combination 602B, the combination take rate determination can adjust the combination take rates 432 to remove the negative value. In some embodiments, the combination take rate determination can adjust the combination take rates 632 to remove the negative value by setting the negative value to zero and then reducing the other values in the combination take rates 642 corresponding to the option combinations 602A and 602C-602E by an aggregate value corresponding to the increase in the negative value. For example, setting the negative value to zero raises that combination take rate by 1.2%, the combination take rate determination can reduce the other values in the combination take rates 642 corresponding to the option combinations 602A and 602C-602E by an aggregate of 1.2%. The adjustment to the option combinations 602A and 602C-602E, as shown in FIG. 6E, can be made on a pro rata basis, which generates final combination take rates 642 for the option combinations 602A-602E.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

CONCLUSION

While the application describes specific examples of carrying out embodiments of the invention, those skilled in the art will appreciate that there are numerous variations and permutations of the above described systems and techniques that fall within the spirit and scope of the invention as set forth in the appended claims. For example, while specific terminology has been employed above to refer to electronic design automation processes, it should be appreciated that various examples of the invention may be implemented using any desired combination of electronic design automation processes.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:

1. A method comprising:
receiving, by a computing system, a target rate for each option available for inclusion in one or more wire harnesses of a harness family for a product, and wiring information describing components in the wire harnesses configured to implement the options in the harness family for the product;
determining, by the computing system, combination take rates for different combinations of the options by estimating values for the combination take rates corresponding to the combinations of the options and by utilizing the estimated values for the combination take rates to iteratively adjust the estimated values for the combination take rates based on the target rates for the options, wherein the estimated values of the combination take rates, having been adjusted based on the target rates for the options, correspond to a number of wire harnesses to manufacture for each of the different combinations of the options; and
utilizing, by the computing system, the components implementing the options from the wiring information, the combination take rates, and the combinations of the options to set configurations for the wire harnesses, each including a different set of the options, in the harness family for the product.

2. The method of claim 1, wherein utilizing the estimated values for the combination take rates to iteratively adjust the estimated values for the combination take rates further comprises:
based on the estimated values for the combination take rates, ascertaining actual rates that each option is selected for inclusion in the harness family;
selectively adjusting the estimated values for the combination take rates based on a difference between the actual rates for the options and the target rates for the options; and
when the estimated values for the combination take rates were adjusted, re-performing the ascertaining and selectively adjusting with the adjusted values for the combination takes rates.

3. The method of claim 2, wherein the utilization of the combination take rates to set the configurations of the wire harnesses in the harness family is performed when the values for the combination take rates were not adjusted during the selectively adjusting.

4. The method of claim 2, wherein selectively adjusting the estimated values for the combination take rates further comprises adjusting the values for the combination take rates based, at least in part, on an error corresponding to the difference between the actual rates for the options and the target rates for the options.

5. The method of claim 1, wherein determining the combination take rates further comprises: setting any negative values for the combination take rates to zero; and adjusting the values of one or more of the other combination take rates based on a magnitude of the negative values.

6. The method of claim 1, wherein each option corresponds to a different one of the target rates defining a percentage of the products estimated to include that option, and each of the combination take rates corresponds to a percentage of the products estimated to include a different combination of the options.

7. A system comprising:
a memory system configured to store computer-executable instructions; and
a computing system, in response to execution of the computer-executable instructions, is configured to:
receive a target rate for each option available for inclusion in one or more wire harnesses of a harness family for a product, and wiring information describing components in the wire harnesses configured to implement the options in the harness family for the product;
determine combination take rates for different combinations of options by estimating values for the combination take rates corresponding to the combinations of the options and by utilizing the estimated values for the combination take rates to iteratively adjust the estimated values for the combination take rates based on the target rates for the options, wherein the estimated values of the combination take rates, having been adjusted based on the target rates for the options, correspond to a number of the wire harnesses to manufacture for each of the different combinations of the options; and
set configurations for the wire harnesses, each including a different set of the options, in the harness family for the product based on the components implementing the options described in the wiring information, the combination take rates, and the combinations of the options.

8. The system of claim 7, wherein the computing system, in response to execution of the computer-executable instructions, is further configured to:
ascertain actual rates that each option is selected for inclusion in the harness family based on the estimated values for the combination take rates;

selectively adjust the estimated values for the combination take rates based on a difference between the actual rates for the options and the target rates for the options; and when the estimated values for the combination take rates were adjusted during the selective adjustment, re-perform the ascertainment and selective adjustment with the adjusted values for the combination takes rates.

9. The system of claim 8, wherein the setting of the configurations for the wire harnesses in the harness family is performed when the values for the combination take rates were not adjusted during the selective adjustment.

10. The system of claim 8, wherein the computing system, in response to execution of the computer-executable instructions, is further configured to adjust the estimated values for the combination take rates based, at least in part, on an error corresponding to the difference between the actual rates for the options and the target rates for the options.

11. The system of claim 7, wherein each option corresponds to a different one of the target rates defining a percentage of the products estimated to include that option, and each of the combination take rates corresponds to a percentage of the products estimated to include a different combination of the options.

12. An apparatus comprising at least one non-transitory computer-readable memory device storing instructions configured to cause one or more processing devices to perform operations comprising:

receiving a target rate for each option available for inclusion in one or more wire harnesses of a harness family for a product, and wiring information describing components in the wire harnesses configured to implement the options in the harness family for the product;

determining combination take rates for different combinations of options by estimating values for the combination take rates corresponding to the combinations of the options and by utilizing the estimated values for the combination take rates to iteratively adjust the estimated values for the combination take rates based on the target rates for the options, wherein the estimated values of the combination take rates, having been adjusted based on the target rates for the options, correspond to a number of wire harnesses to manufacture for each of the different combinations of the options; and utilizing the components implementing the options described in the wiring information, the combination take rates, and the combinations of the options to set configurations for the wire harnesses, each including a different set of the options, in the harness family for the product.

13. The apparatus of claim 12, wherein iteratively adjusting the values for the take rates further comprises:

based on the estimated values for the combination take rates, ascertaining actual rates that each option is selected for inclusion in the harness family;

selectively adjusting the estimated values for the combination take rates based on a difference between the actual rates for the options and the target rates for the options; and when the estimated values for the combination take rates were adjusted, re-performing the ascertaining and selectively adjusting with the adjusted values for the combination takes rates.

14. The apparatus of claim 13, wherein the utilization of the combination take rates to set the configurations of the wire harnesses in the harness family is performed when the values for the combination take rates were not adjusted during the selectively adjusting.

15. The apparatus of claim 13, wherein selectively adjusting the values for the combination take rates further comprises adjusting the estimated values for the combination take rates based, at least in part, on an error corresponding to the difference between the actual rates for the options and the target rates for the options.

16. The apparatus of claim 12, wherein determining the take rates further comprises: setting any negative values for the combination take rates to zero; and adjusting the values of one or more of the other combination take rates based on a magnitude of the negative values.

17. The apparatus of claim 12 wherein each option corresponds to a different one of the target rates, which defines a percentage of the products estimated to include that option, and each of the combination take rates corresponds to a percentage of the products estimated to include a different combination of the options.

* * * * *